No. 717,537. PATENTED JAN. 6, 1903.
C. H. BROWN.
CAKE OR DOUGHNUT CUTTER.
APPLICATION FILED MAR. 22, 1902.
NO MODEL.
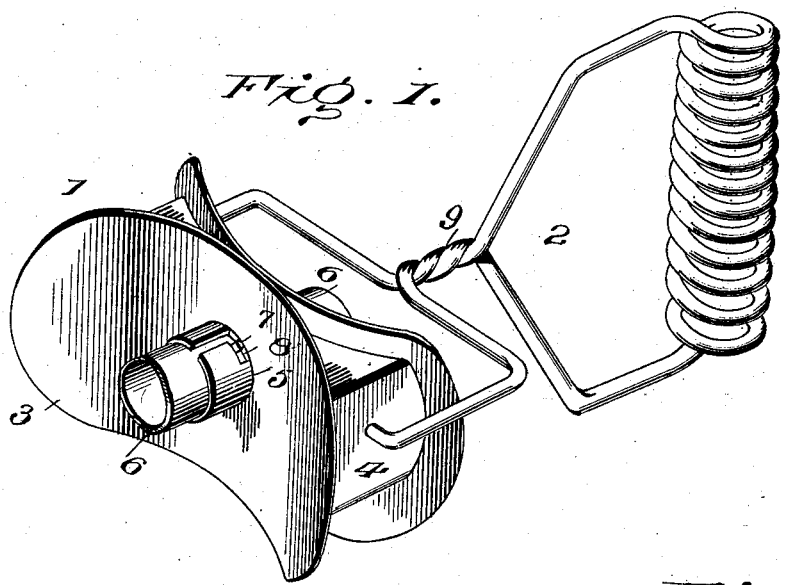
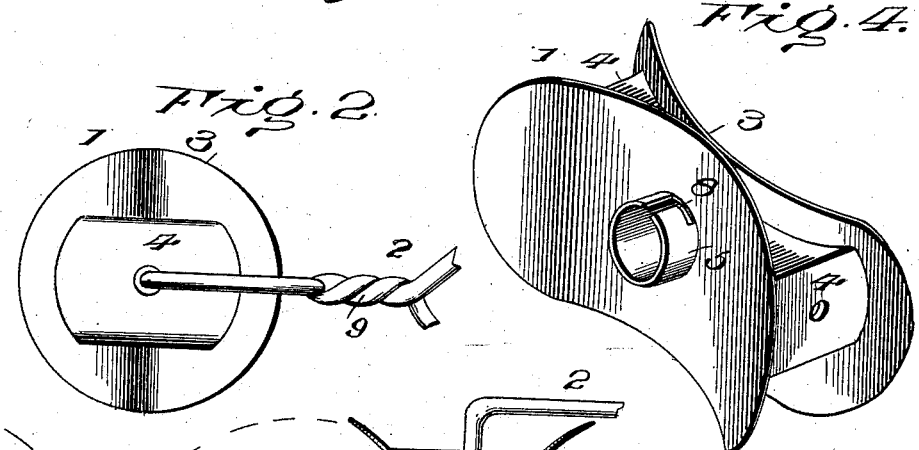
Inventor
C. H. Brown

UNITED STATES PATENT OFFICE.

CHARLES H. BROWN, OF DUBOIS, PENNSYLVANIA, ASSIGNOR OF ONE-HALF TO J. H. SMITH, OF DUBOIS, PENNSYLVANIA.

CAKE OR DOUGHNUT CUTTER.

SPECIFICATION forming part of Letters Patent No. 717,537, dated January 6, 1903.

Application filed March 22, 1902. Serial No. 99,512. (No model.)

*To all whom it may concern:*

Be it known that I, CHARLES H. BROWN, a citizen of the United States, residing at Dubois, in the county of Clearfield and State of Pennsylvania, have invented certain new and useful Improvements in Cake or Doughnut Cutters; and I do hereby declare the following to be a full, clear, and exact description of the invention, such as will enable others skilled in the art to which it appertains to make and use the same.

This invention provides a cutter for cakes, doughnuts, and the like of novel and unique construction readily operable by being rotated over the dough rolled upon a breadboard, thereby differing materially from the cutters of this class as generally constructed and obviating the difficulty commonly experienced by the cake, doughnut, or the like sticking in the cutters of the type embodying a plate and an inclosing cutting-rim.

In accordance with this invention the cutter comprises a plate of suitable shape mounted so as to be rolled over a sheet of dough and cut therefrom a cake, doughnut, or the like of required shape. In the specific construction a number of plates are grouped about an axis, so as to operate in succession upon a sheet of dough over which the cutter is rotated.

The cutter embodies in its construction a removable center to admit of the cakes being left solid or provided with central openings, as desired, the latter being highly preferable in the case of doughnuts in order to admit of the hot fat reaching every part, so as to secure the best possible results.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a cutter embodying the invention. Fig. 2 is a side view. Fig. 3 is a top view, the cutting-plates being turned so as to occupy a vertical position. Fig. 4 is a detail view having the central cutter removed.

Corresponding and like parts are referred to in the following description and indicated in all the views of the drawings by the same reference characters.

The cutter comprises, essentially, two parts—a rotary head 1 and a handle 2, the latter being of any suitable construction to admit of convenient manipulation of the cutter when in operation. The rotary head comprises an oblong plate 3, of approximately oval form and longitudinally curved, the minor axis being of such relative length in proportion to the major axis and the longitudinal curvature of the plate to admit of the circumscribing edge of the plate providing a circle when rolled over a surface upon its longitudinal axis, this being necessary in order to cut a cake, doughnut, or the like of circular outline. In accordance with this invention and in order to balance the cutter two such plates 3 are provided and are placed with their convex sides touching on a medial line, the plates curving outward in opposite directions. The spaces between the oppositely-curved end portions of the plates are filled by angle-pieces 4, which constitute braces and are centrally perforated to receive the inturned ends of the handle, forming journals upon which the rotary head turns when the cutter is in operation. These angle-pieces 4 are constructed of sheet-metal blanks, having their end portions bent and are soldered or otherwise firmly attached to the end portions of the plates, so as to stiffen and brace them, as well as provide bearings for the rotary head. The plates are symmetrically curved, and the profile of their cutting edges in side elevation is approximately circular. The plates are centrally apertured, a short tube 5 being fitted in the opening and extending a short distance into the hollow or concave side of each of the plates. A second tube 6 is removably fitted in the tube 5, and its ends project to a curved plane touching opposite end portions of corresponding plates, this tube 6 being, in effect, a cutter for centrally perforating doughnuts or cakes requiring a central opening. A cutting-tube 6 is held to the fixed tube 5 by any means suitable for the purpose, and, as shown, a pin 7, firmly attached to the cutting-tube 6, is adapted to enter a bayonet-slot 8, formed in an end portion of the fixed tube 5. When the cutting-tube 6 is removed, the cake or like article is formed without a central opening, and when the tube 6 is in place the doughnut or cake is centrally perforated. The handle may be of any construction and, as shown, is constructed of stout wire doubled upon itself and having the folded end portions intertwisted, as shown at 9, the end portions being oppositely bent from the twisted part 9, thence bent to extend parallel, and having their terminal portions inturned to form journals, which are sprung into openings in the angle-pieces 4. The folded end portion of the wire constitutes a loop, which is in a plane at a right angle to the plane of the end portion receiving the rotary head, the upright portion of the handle being formed of a series of coils to provide a firm grip for the hand.

To use the cutter, it is necessary to roll the dough upon the bread-board into a sheet in the ordinary way, after which the cutter is rolled over the sheet and divides the same into pieces of required shape. It is possible within the purview of the invention to so shape the plates 3 as to cut cakes of different forms. Hence it is not the intention to restrict the cutter to the precise outline illustrated.

Having thus described the invention, what is claimed as new is—

The herein-described rotary cutter comprising oblong plates of approximately oval form, longitudinally curved and arranged with their convex sides in opposition and touching at a middle point, a fixed tube located in an opening central of the plates and extended into the hollow sides thereof and having a bayonet-slot in an end portion, a cutting-tube removably fitted in the fixed tube and having its cutting ends projected beyond the extremities thereof and conforming to planes touching end portions of corresponding plates, a pin projected laterally from the cutting-tube for coöperation with the bayonet-slot of the fixed tube, filling-pieces located in the spaces formed between the diverged end portions of the plates, and a handle having its end portions journaled to the said filling-pieces, substantially as set forth.

In testimony whereof I affix my signature in presence of two witnesses.

CHARLES H. BROWN. [L. S.]

Witnesses:
W. H. MILLER,
M. J. SLOPPY.